United States Patent [19]

Kimmel

[11] 4,040,006
[45] Aug. 2, 1977

[54] JACKNIFE WARNING SYSTEM

[76] Inventor: Robert W. Kimmel, 121 Swann Road, Clearwater, Fla. 33516

[21] Appl. No.: 612,093

[22] Filed: Sept. 10, 1975

[51] Int. Cl.² .............................................. B60Q 1/12
[52] U.S. Cl. .................................. 340/52 R; 340/282; 280/432; 200/61.44
[58] Field of Search ...................... 340/52 R, 275, 282; 280/432; 200/52 R, 61.44

[56] References Cited

U.S. PATENT DOCUMENTS

| 2,454,626 | 11/1948 | Borzell | 340/52 R |
| 2,927,310 | 3/1960 | Knapp | 340/52 R |
| 3,588,809 | 6/1971 | Devlin | 340/52 R |

Primary Examiner—John W. Caldwell
Assistant Examiner—Joseph E. Nowicki
Attorney, Agent, or Firm—Duckworth, Hobby, Orman, Allen & Pettis

[57] ABSTRACT

A warning system designed to be interconnected between a towing vehicle such as a conventional automobile and a trailer or like device comprising a towed vehicle wherein the warning system includes a circuit defined by electrically connected elements. Such elements include an indicator member which could be an audible alarm connected to a power source which in turn is electrically interconnected to one or more sensing arms mounted on the towed vehicle. The circuit is further defined by being electrically grounded to a conductive portion of the frame of the towing vehicle such that engagement between one of the sensing arms and a conductive portion of the frame of the towing vehicle causes a completion of the circuit and activation of the alarm member. The one or more conductive arms are mounted on the towed vehicle and configured and/or disposed to extend outwardly therefrom so as to engage a conductive portion of the frame of the towing vehicle when a predetermined angular orientation occurs between the towed and towing vehicle such as when the vehicles tend to "jackknife" relative to one another.

3 Claims, 4 Drawing Figures

U.S. Patent    Aug. 2, 1977    4,040,006
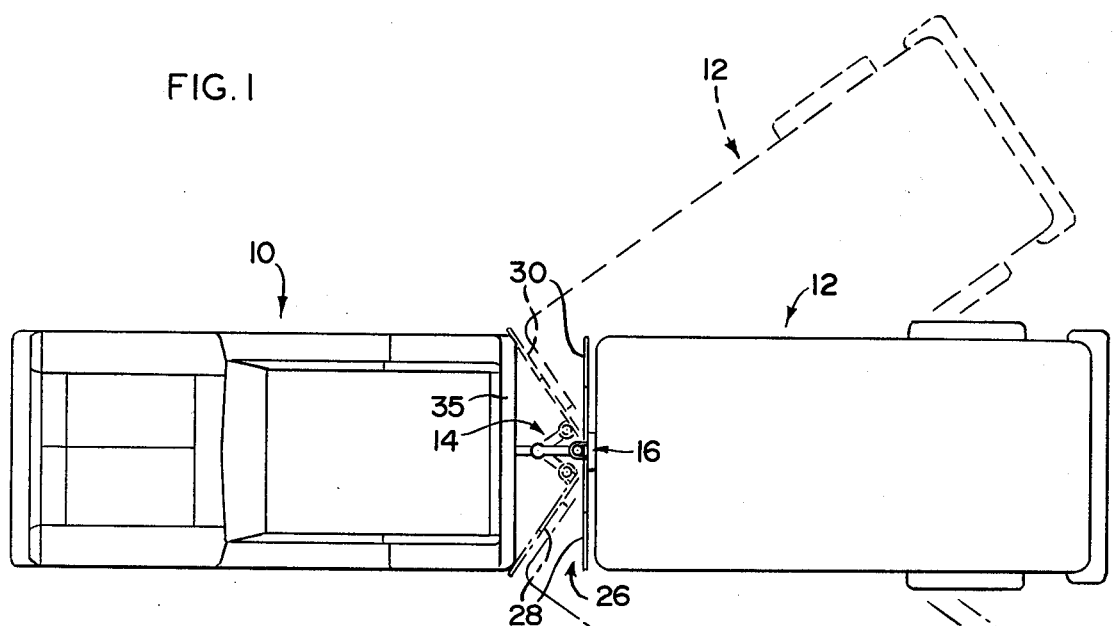
FIG. 1
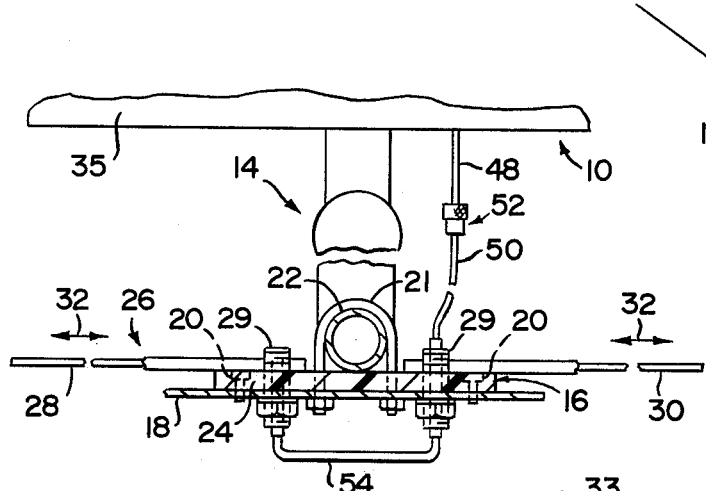
FIG. 2
FIG. 3
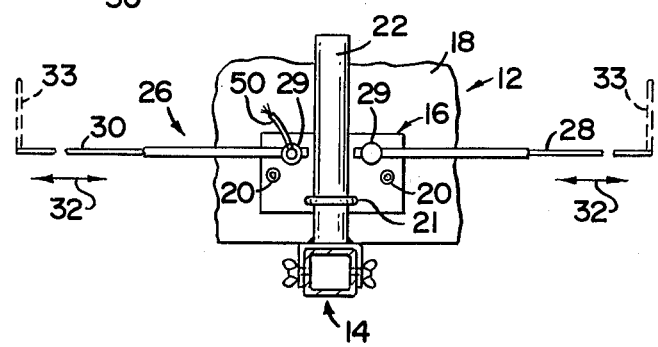
FIG. 4
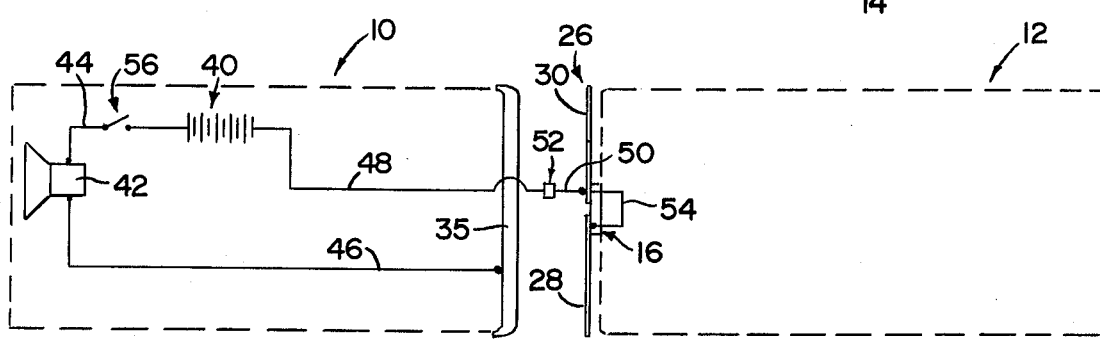

JACKNIFE WARNING SYSTEM

BACKGROUND OF THE INVENTION

1. Field of the Invention

This invention relates to a warning system designed to be interconnected between a towed and towing vehicle of conventional design such that the relative orientation of the vehicles may be regulated through the activation of some type of audible or like alarm system in physical communication with the operator of the towing vehicle, whereby damage may be prevented through inadvertent collision of the vehicle due to a "jacknife" situation.

2. Description of the Prior Art

In recent years the use of the automobile as a towing vehicle has become increasingly popular. More specifically, trailer-type vehicles such as house trailers, storage-type trailers and various other structural equivalents have become the subject of wide usage, especially throughout the United States. This has been especially evident in the leasure trailer industry wherein the towing of mobile homes or like trailers is more and more prevalent.

Many technical problems, however, have arisen wherein the conventional, private automobile is utilized as a towing vehicle for various types of trailer structures. A particular area lies in the possibility of causing damage either to the towing vehicle or the trailer due to an inadvertent collision between the two vehicles. This most commonly occurs in what can be termed a jackknife situation. More frequently, when the driver of a towing vehicle tries to back up or travel in a reverse direction while the towed vehicle is attached to the automobile, control of the direction of travel of the towed vehicle is sometimes cumbersome. This frequently results in an inadvertent and sometimes initially unnoticed hazardous positioning of the vehicle during such an operation. Collision frequently occurs by the rear of the towing vehicle colliding with the front face of the vehicle being towed.

Accordingly, it is highly desirable to indicate in some efficient practical manner to the operator of the towing vehicle when the relative positions of the vehicles are dangerously close. Frequently, this cannot be determined merely by viewing from the operator's position within the towing vehicle.

There does exist in the prior art a number of warning systems which are generally directed to indicating the relative orientations of a towed and towing vehicle during travel. However, the majority of these warning systems are generally directed to the indication or prevention of "fishtailing" normally occurring during straight-line travel of the two vehicles. Such warning system generally sense the sway or orientation of the vehicle being towed and this information, when reaching a hazardous degree, is transmitted to the operator of the towed vehicle so that corrective action can be taken.

Patents disclosing general wording systems of this device are disclosed in Jubenville, U.S. Pat. No. 3,715,003. Similar prior art and commercially available anti-fishtail devices which are primarily directed to the orientation of the vehicle being towed are represented in the Sparr patent, U.S. Pat. No. 3,810,521.

In attempting to develop efficient and practically operating warning systems, a number of highly sophisticated and complex devices have been designed. Such devices include electrical switching assemblies wherein the relative positions of the vehicles are indicated to the operator of the vehicle whereby it is important to give the driver or operator an adequate means to determine the attitude of the trailer during any manuevering of the towed and towing vehicles. Structures of this type are represented in the prior art in the U.S. Patents to Savelli, U.S. Pat. No. 3,605,088 and Marus, U.S. Pat. No. 3,825,921.

While it is assumed that structures of the type set forth above are operable and perhaps practical within certain applications, it is readily acknowledged in the industry that a number of the existing, commercially available warning systems are frequently too complex thereby resulting in high price of maintenance and initial production. Also, due to the potential hazards associated with the traveling of a towed and towing vehicle reliability must be of prime concern in the operation of such a warning system. To insure reliability and durability in operation under that may be considered generally adverse situations, the device must be sufficiently rugged to have a meaningful, operable life while at the same time be of sufficiently simple design and structure to be adequately maintained and purchased at a reasonable cost.

SUMMARY OF THE INVENTION

This invention relates to a warning system which can be adequately termed a jackknife warning system used in connection with a conventional automobile or like towing vehicle when such vehicle is serving to tow a trailer-like structure which may take various specific designs. More specifically, the towed trailer vehicle may be in the form of a house trailer, storage trailer, boat trailer or any like device wherein the trailer structure itself does not have a self-contained power source or is not self-driven.

More specifically, the present invention comprises a base means which preferably comprises a mounting plate made of plastic or like electrically insulative material. This mounting plate is attached to the vehicle being towed in the general area of its front surface or directly on the trailer hitch structure. In any event, the base means should be in the general vicinity of the rear portion of the towing vehicle for reasons to be set forth in more detail hereinafter.

The warning system further comprises a sensing means attached to the mounting plate of the base means so as to be electrically insulated from the frame of the towed vehicle itself. The sensing means may comprise one or more elongated arm members formed from an electrically conductive material. These arm members are disposed on the mounting plate to extend outwardly, preferably laterally therefrom in opposite directions. Such disposition allows engagement between one of the mounting arms and generally the rear portion of the towing vehicle. Ideally, the conductive arms of the sensing means may be disposed to engage the rear bumper of an automobile when a jackknife orientation between the towed and towing vehicle occurs.

The conductive arms of the sensing means further are adjustably mounted on the insulated plate so that their length of extension from the plate, laterally, may be regulated. As will be clearly set forth hereinafter, the amount of extension outwardly from the plate determines the angular orientation between the two vehicles before engagement of the towing vehicle and one of the arms occurs. At this point the warning system is activated as again will be more fully described hereinafter.

An alternate embodiment of the present invention lies in each of the arms being structured into a telescopic relationship to one another wherein each arm comprises one or more parts movable relative to one another. Accordingly, the arms so structured may be generally fixedly attached to the plate and, due to the telescopic configuration may be extended outwardly along its own longitudinal axis to reach the degree of extension necessary to activate the warning system upon engagement between the conductive arm and the rear portion or conductive portion of the towing vehicle. When two separate arms are utilized in the sensing means, these arms are electrically interconnected to one another in series so that contact between the rear portion of the towing vehicle and either of the arms may serve to complete the circuit that will be described hereinafter, and thereby activate the warning system.

The warning system further comprises an indicator means which may be in the form of an audible alarm element electrically connected to a power source wherein completion of the circuit serves to direct current to the audible alarm thereby giving an indication of the relative orientations of the two vehicles to the operator of the towing vehicle in order that collision between the vehicles may be prevented.

The circuit means referred to above is defined in part by the indicator means, a power source and a conductive portion of the towing vehicle itself. The sensing means further are included in the circuit wherein, more specifically, each of the electrically conductive arms are connected in series to one another and electrically connected to the power source. Accordingly, since the circuit is grounded in the conductive portion of the towing vehicle, the circuit will be completed and alarm element will be activated upon the conductive arm engaging a conductive portion of the towing vehicle.

It is readily seen therefore that an important feature of the present invention is the structure and disposition of the conductive arms in such a way as to regulate their extension outwardly from the base means. This in turn regulates or controls the point at which engagement occurs between the rear portion of the towing vehicle and one of the arms upon a jackknifing or angular orientation occurring between the towed and towing vehicles. Further structural features of the present invention may include the use of an on/off switch within control of the operator of the vehicle such that the entire system may be deactivated. Accordingly, when the switches remain in an open position, it is readily obvious that contact between one of the conductive arms and a conductive portion of the towing vehicle does not complete the circuit and the alarm element is of course not activated.

Yet another embodiment of the present invention may comprise using the automobile horn, indicating lights or other audible or visual indicating signals normally associated with the automobile. Along these lines the regular battery which serves to power the electrical system of the automobile may be utilized as the power source rather than the utilization of an auxiliary power source merely to supply electrical current to the alarm element. Therefore, it can be readily seen that the present invention is intended to include a circuit structure which is designed to have either an alarm element normally associated with an automobile or an auxiliary alarm member and an auxiliary power source or the power source normally associated with the automobile.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a top view showing the relative positions of the towed and towing vehicle with the external parts of the subject warning system mounted on the towing vehicle represented in broken lines in a jackknife position wherein the warning system is activated.

FIG. 2 is a front plan view of one embodiment of the warning system mounted on a trailer hitch or assembly attached to the towed vehicle.

FIG. 3 is a top plan, partial cutaway and sectional view of the base means of the subject warning system with the sensing means attached thereto and being interconnected to the remaining circuit portion of the warning system mounted on the towed vehicle.

FIG. 4 is a schematic circuit representing the relative positions and interconnections of the various components of the warning system of the present invention.

Similar reference characters refer to similar parts throughout the several views of the drawings.

DETAILED DESCRIPTION

The structural and electrical components of the warning system of the present invention are set forth in FIGS. 1 through 4 described in detail hereinafter. More specifically, the warning system hereinafter described is intended for use in combination or inconnection with a towing vehicle generally indicated as 10 and a towed vehicle generally indicated as 12 which are interconnected to one another by what may be considered a conventional hitch assembly 14. As will be described in detail hereinafter, the representations of the trailer or tow vehicle 12, in broken lines, indicates a jackknife orientation between the towing vehicle 10 and the towed vehicle 12 wherein the warning system of the present invention is activated as will be described in detail hereinafter.

It should be noted however, that while the present invention is specifically described with relationship to a towed and towing vehicle, the vehicles themselves and/or any hitching arrangement to which the portions of the components of the warning system may be connected are not per se a part of the present invention and are not intended to "limit"the claims hereinafter set forth. It should be obvious that any towed or towing vehicle could be utilized wherein the system is intended to prevent inadvertent collision or engagement between correspondingly positioned portions of the towed and towing vehicles and in relationship to the system itself these vehicles merely represent "platforms" on which the respective portions of the system are mounted for operative use.

Turning to FIGS. 2 and 3, the warning system comprises a base means generally indicated as 16 mounted on the front surface or wall portion 18 or adjacent thereto of the vehicle being towed. Connection thereto may be in the form of conventional connector elements 20 or alternately the base means 16 may be correspondingly positioned on the towed vehicle by means of a connector in the form of a U-bolt 21 being physically attached to a support rod portion 22 of the trailer hitch assembly. In any event, the base means 16 may comprise a plate 24 which is preferably formed form an electrically insulative material such as plastic or the like. The disposition of the base plate 24 is such as to render the sensing means (hereinafter described in greater detail) in spaced but communicating relation with the rear portion of the towed vehicle 10. Means generally indicated as 26 which may be in the form of at least one and preferably two arm members 28 and 30. Each of the arm members 28 and 30 are formed from an electrically conductive material and are mounted on base plate 24 by adjusting means 29. These adjusting means may be in the form of set screws or any type of substantially conventional connectors such that the arm members 28 and 30 may be adjustably mounted on the base plate 24. More specifically, directional arrows 32 indicate that the perferable disposition of the arms 28 and 30 are to extend outwardly and laterally from the base plate (FIGS. 2 and 3).

The configuration of the arms 28 and 30 are preferably linear in that they are made from a substantially flexible and certainly conductive material. Their engagement with a rear portion of the towed vehicle is readily accomplished so as to complete an activating circuit of the warning system which will be described in greater detail hereinafter. Alternately, however, the arms 28 and 30 may have various configurations to insure this contact with a conductive portion of the vehicle 10. Such an alternate configuration may include an upstanding finger member 33 represented in broken lines. Again, the primary purpose of such an alternate configurtion would be to insure contact with a conductive portion of the rear portion of the vehicle such as the rear bumper 35 if, in fact, such bumper is made from a conductive material.

With regard to the above-noted activating surface, reference is directed to FIGS. 2, 3 and especially 4. More specifically, a power source 40 which may either be an auxiliary power source or the normal battery associated with the powering of the electrical system of the automobile is mounted on the towed vehicle 10. Indicator means 42 may comprise an audible alarm element such as a horn or the like and is electrically connected to the power source 40 through conductor 44. Conductor 46 serves to ground the circuit and the components therein to an electrically conductive portion of the frame of the vehicle 10. In the embodiment shown in FIG. 2, 3 and 4, this electrically conductive portion very well may be the bumper 35 or any other electrically conductive portion of the frame in electrical conductive relation to the bumper 35 or other portion which is intended to engage the sensing means and more particularly the arms 28 and 30 of the sensing means. Lead in conductor 48 is positioned to electrically connect the negative terminal of the power source 40 and the sensing means 16. Conductor 50 represents a portion of the circuit which serves to interconnect conductor 48 with a power source wherein a conventional electrical connector or plug element 52 may serve to join the connectors 48 and 50 as when the sensing means 16 is mounted on the towing vehicle 12 and is thereby connected to the remainder of the circuit through conductor 48. In the specific circuit configuration it is desirable for the conductive arms 28 and 30 to be conducted in series with one another. Accordingly, an interconnecting conductor element 54 may serve to so interconnected the conductive arms 28 and 30. By virtue of this connection, either arm 28 or 30 may contact or engage an electrically conductive portion 35 of the vehicle 10 in order to complete the circuit.

As is evident from the above description and in a thorough review of the drawings, this circuit is completed when a jackknife orientation occurs to the extent that the relative angular orientations of the towed vehicle 12 and the towing vehicle 10 is such to cause a potential collision between the two vehicles. The disposition of the arms 28 and 30 is such as to first engage bumper 35 or other conductive portions of the vehicle 10 at a point before actual collision occurs. As should be evident, the engagement of either arm 28 and 30 with a conductive portion 35 of vehicle 10 causes a completion of the circuit and an activation of the signal means 42 so as to alert the operator of the vehicle that a collision is eminent.

In operation, on/off switch 56 is closed so as to place the entire warning system in operative mode. Accordingly, this creates a "potential" circuit between power source 40, indicator means 42, bumper 35 or other electrically conductive portions of the frame of vehicle 10. The circuit is further defined by electrical interconnection between the negative terminal of the power source 40 and a sensing means 17. More specifically the conductor 48 may be connected through a common electrical connector 52 when the towed vehicle 12 is attached through a conventional trailer hitch assembly 14 (See FIG. 3). With circuit potentially completed, closing of the circuit and activation of the indicator means 42 occurs upon either of the arms 28 and 30 contacting the bumper 35 or any other electrically conductive portion of the frame 10 to which the circuit is grounded, as through electrical conductor 46.

With brief reference to FIG. 1, therefore, it is readily seen that in a jackknife orientation only a limited amount of angular orientation is permitted before contact occurs between bumper 35 or an electrically conductive portion of the frame of the vehicle 10 and one of the arms 28 or 30. As set forth above, this completes the circuit and serves to notify the operator, through indicator 42 that collision is eminent.

It will thus be seen that the objects made apparent from the preceding description are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Now that the invention has been described, what is claimed is:

1. A warning system of the type used with a towed vehicle and a towing vehicle to determine the relative orientation thereof, said warning system comprising: base means mounted on the towed vehicle, sensing means attached to said base means and extending outwardly therefrom in communicating disposition relative to the towing vehicle, said sensing means comprising at least two elongated arms, each arm formed from an electrically conductive material, each of said two arms electrically connected in parallel to one another, and disposed and configured to extend laterally outwardly from said base means, each of said arms comprising a plurality of arm portions interconnected to one another in telescoping relation so as to be adjustable outwardly along a longitudinal axis of each arm in substantially opposite directions, each of said arm members disposed to extend outwardly from said base into engagement with a conductive portion of the towing vehicle, when the towed and towing vehicles are in a predetermined spaced relation to one another, whereby relative movement of the towed and the towing vehicle toward one another beyond the point of engagement of one of said arm members and a connective portion of the towing vehicle is regulated; said base means comprising a plate element formed from insulating material and securely attached to the towed vehicle, adjusting means disposed in movable, interconnecting relation between each of said two arms, whereby each of said two arms is adjustably positioned relative to said plate element, said plate element disposed to define an insulated barrier between each of said arms and the towed vehicle; indicator means mounted on the towing vehicle in communicating position relative to an operator thereof, electrical circuit means defined at least in part by a power source, each of said arms, a switch, said indicating means and an electrically conductive portion of the towing vehicle, whereby said electric circuit means is completed upon engagement between the conductive portion of the towing vehicle and one of said arm members.

2. A warning system as in claim 1 wherein said indicator means comprises an auxiliary alarm member electrically connected to circuit with the power source and grounded to a conductor portion of the towing vehicle, said sensing means disposed in engageable relation with a conductive portion of the towing vehicle when the towed and towing vehicles are in a relative, predetermined orientation to one another.

3. A warning system as in claim 1 wherein said indicator means comprises an alarm member normally found in the towing vehicle, said alarm member electrically connected to the electrical power supply used in combination with the powering of the towing vehicle.

* * * * *